United States Patent [19]

Sugiyama et al.

[11] Patent Number: 5,105,317
[45] Date of Patent: Apr. 14, 1992

[54] CASSETTE LOADING AND LID MECHANISMS FOR A PORTABLE VIDEO TAPE RECORDER

[75] Inventors: Yoshiaki Sugiyama; Toshiaki Kojima, both of Kanagawa, Japan

[73] Assignee: Sony Corporation, Tokyo, Japan

[21] Appl. No.: 509,746

[22] Filed: Apr. 17, 1990

[30] Foreign Application Priority Data

| Apr. 19, 1989 | [JP] | Japan | 1-45996[U] |
| Apr. 28, 1989 | [JP] | Japan | 1-110356 |
| Apr. 28, 1989 | [JP] | Japan | 1-110357 |

[51] Int. Cl.⁵ .......................................... G11B 15/675
[52] U.S. Cl. ........................................ 360/71; 360/96.5
[58] Field of Search ................................. 360/96.5, 71

[56] References Cited

U.S. PATENT DOCUMENTS

| 4,642,714 | 2/1987 | Miyamoto | 360/96.5 |
| 4,918,549 | 4/1990 | Katono et al. | 360/96.5 |
| 4,933,790 | 6/1990 | Mitumaru | 360/96.5 |

Primary Examiner—Robert S. Tupper
Attorney, Agent, or Firm—Alvin Sinderbrand; William S. Frommer

[57] ABSTRACT

A cassette loading apparatus for a video tape recorder includes a cabinet having a cassette insertion opening therein which is adapted to insertably receive a video tape cassette, and a lid mounted on the cabinet for movement between a first position, wherein the cassette insertion opening is closed, and a second position, wherein the cassette insertion opening is open. A cassette holder is adapted to accept and hold a cassette inserted therein and is movable between a cassette insertion position, which is adjacent to the cassette insertion opening, and a cassette operation position, spaced rearwardly and downwardly from the cassette insertion position. A cassette holder driving mechanism is provided to move the cassette holder between the cassette insertion position and the cassette operation position. When the lid is moved to its second or open position, a switch is automatically closed, for actuating the cassette holder driving mechanism so that the cassette holder is moved from the cassette operation position to the cassette insertion position.

30 Claims, 13 Drawing Sheets

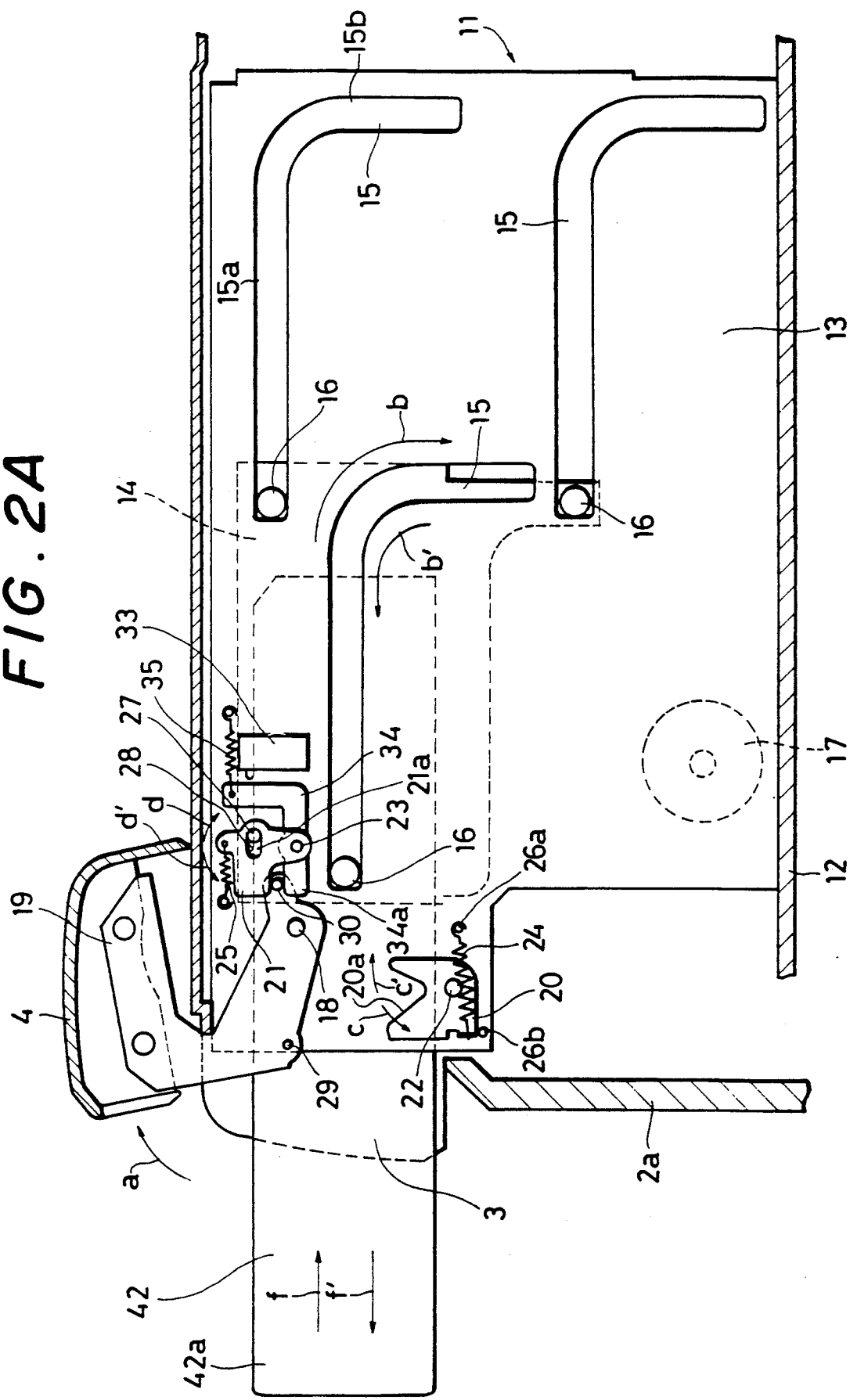

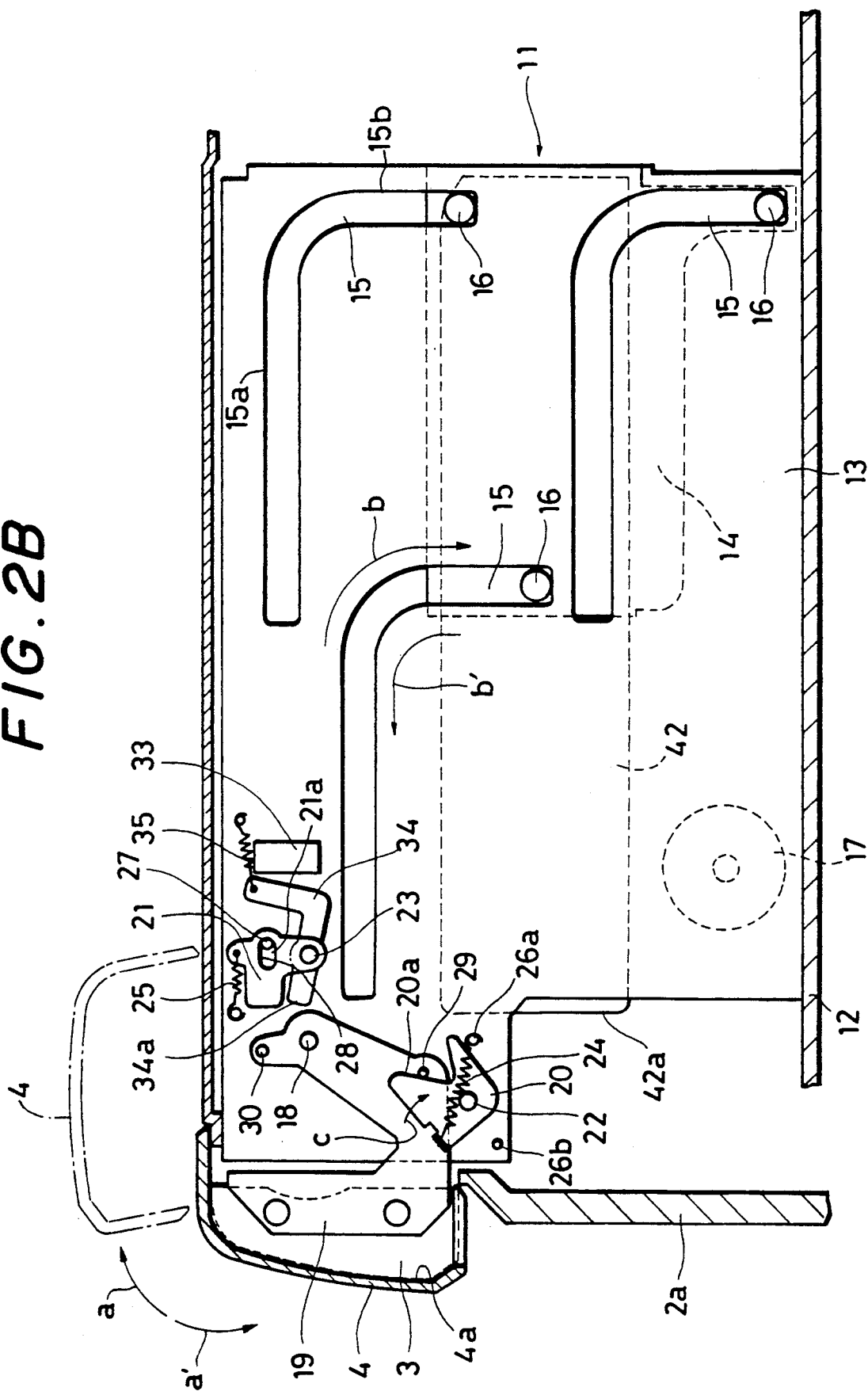

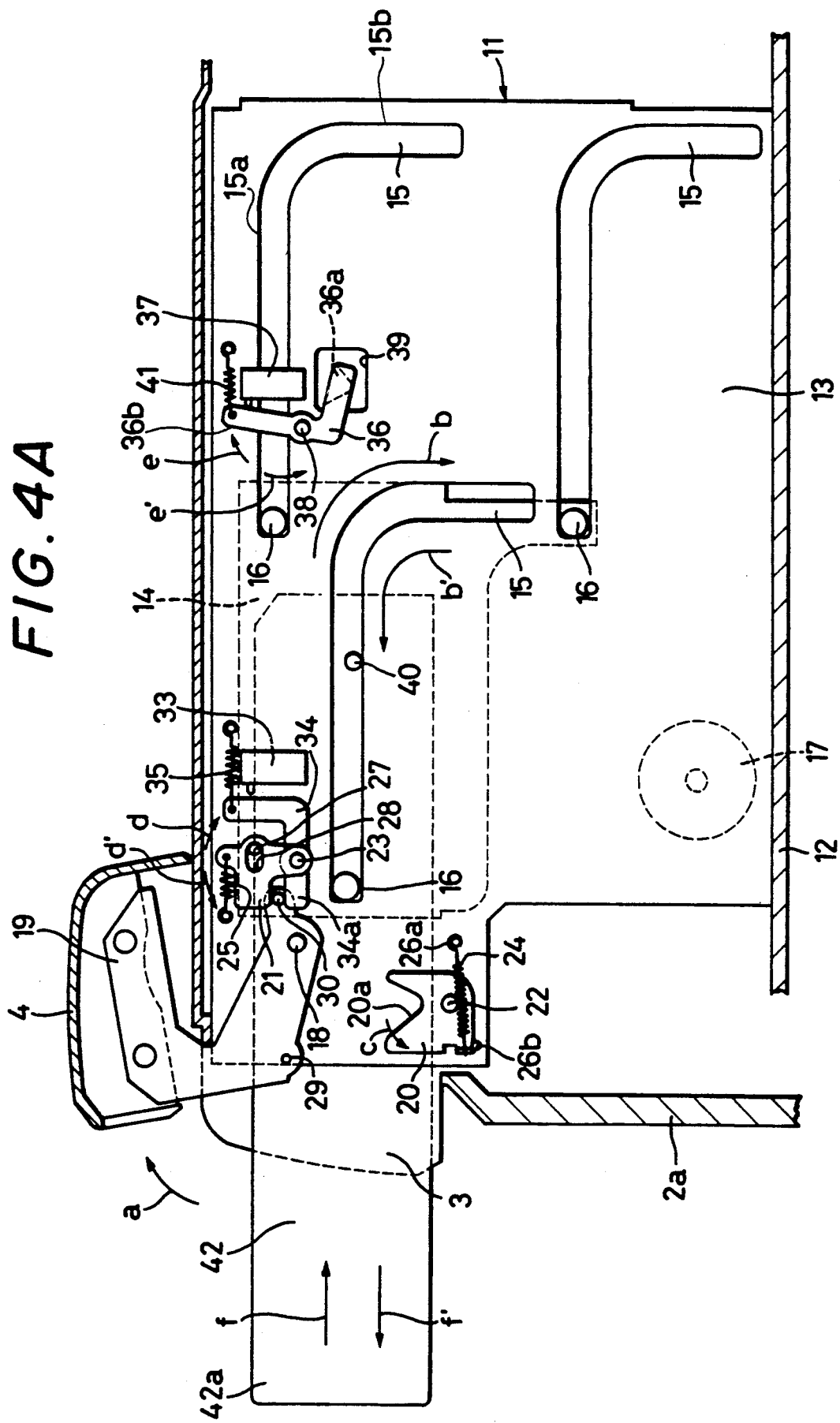

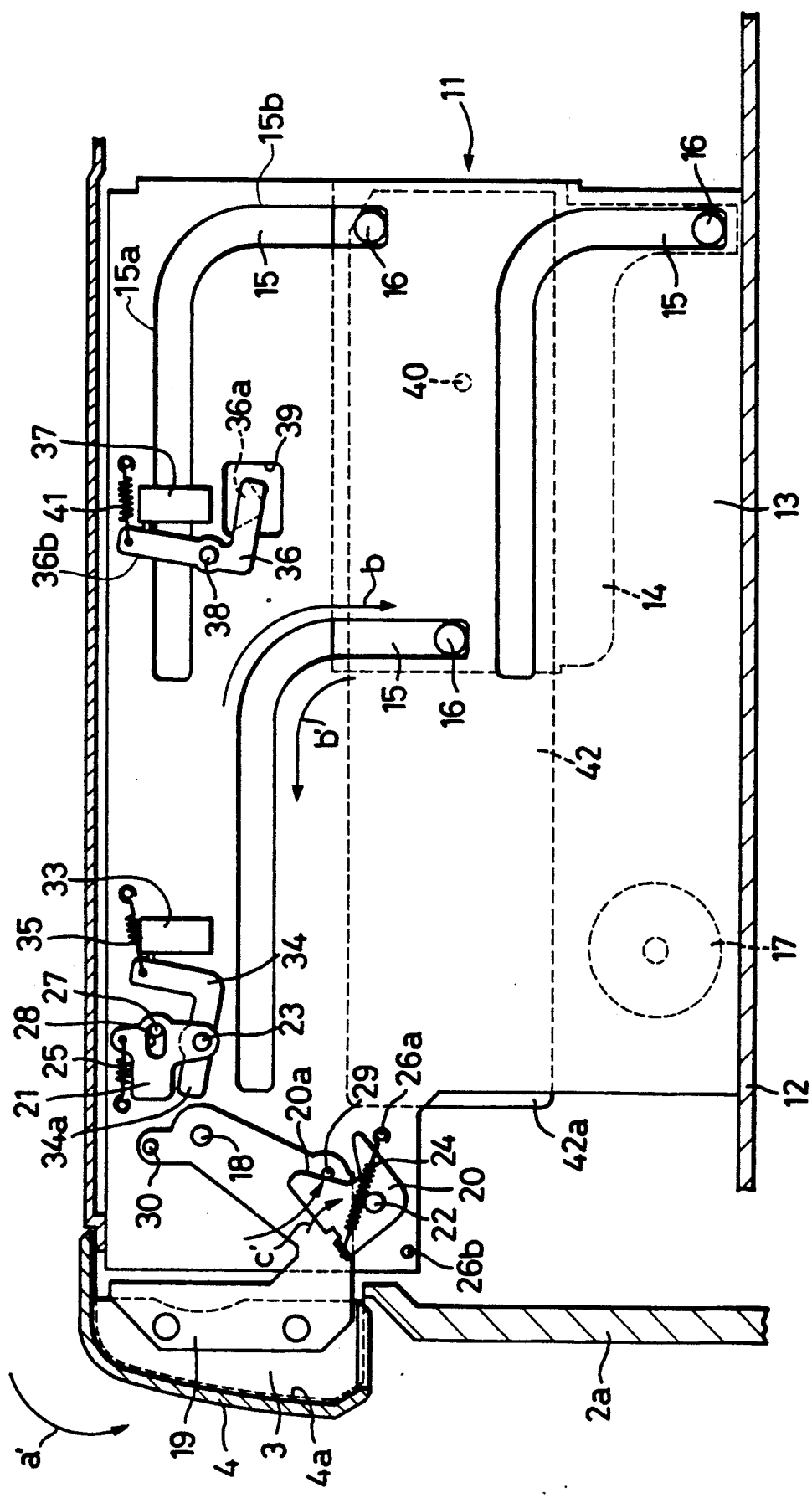

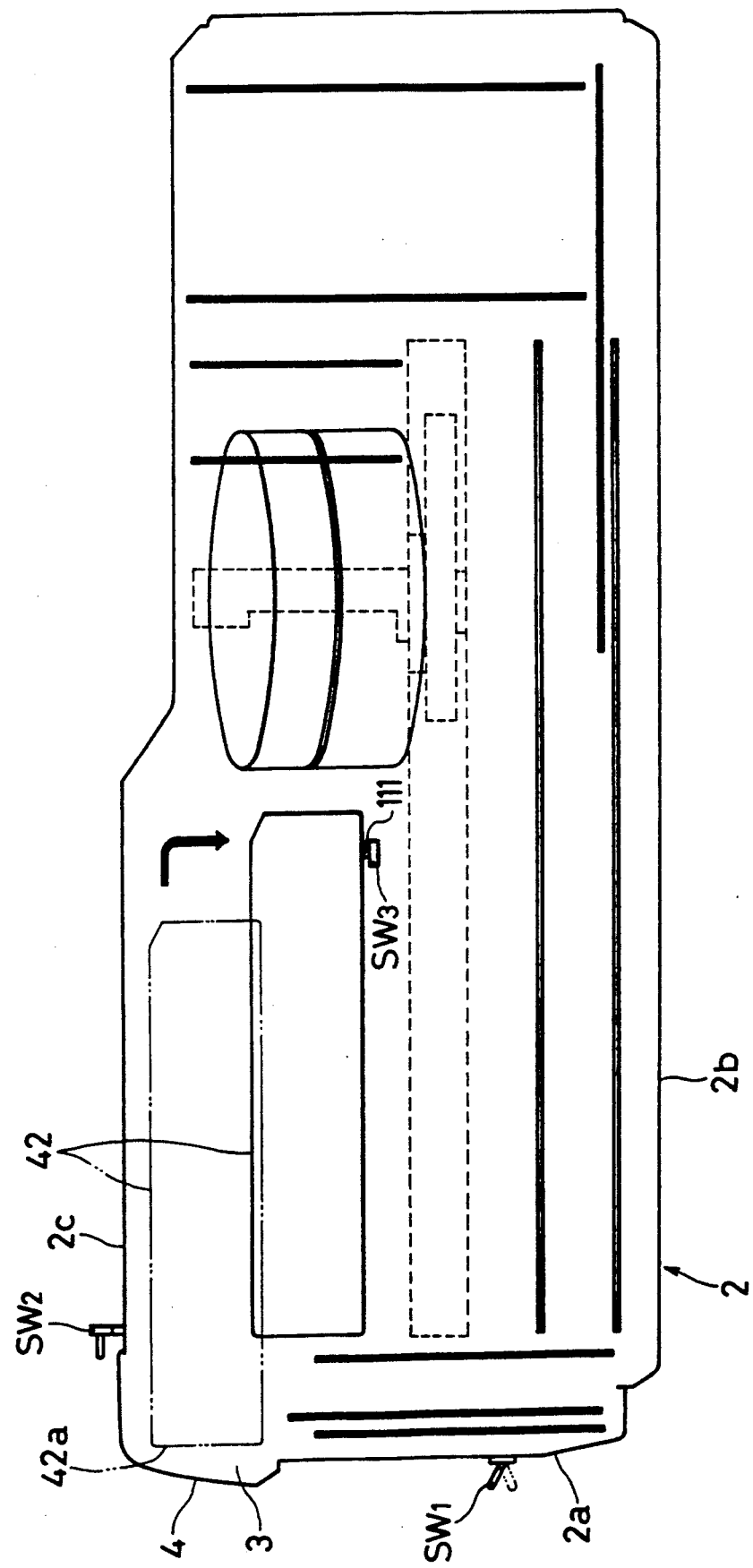

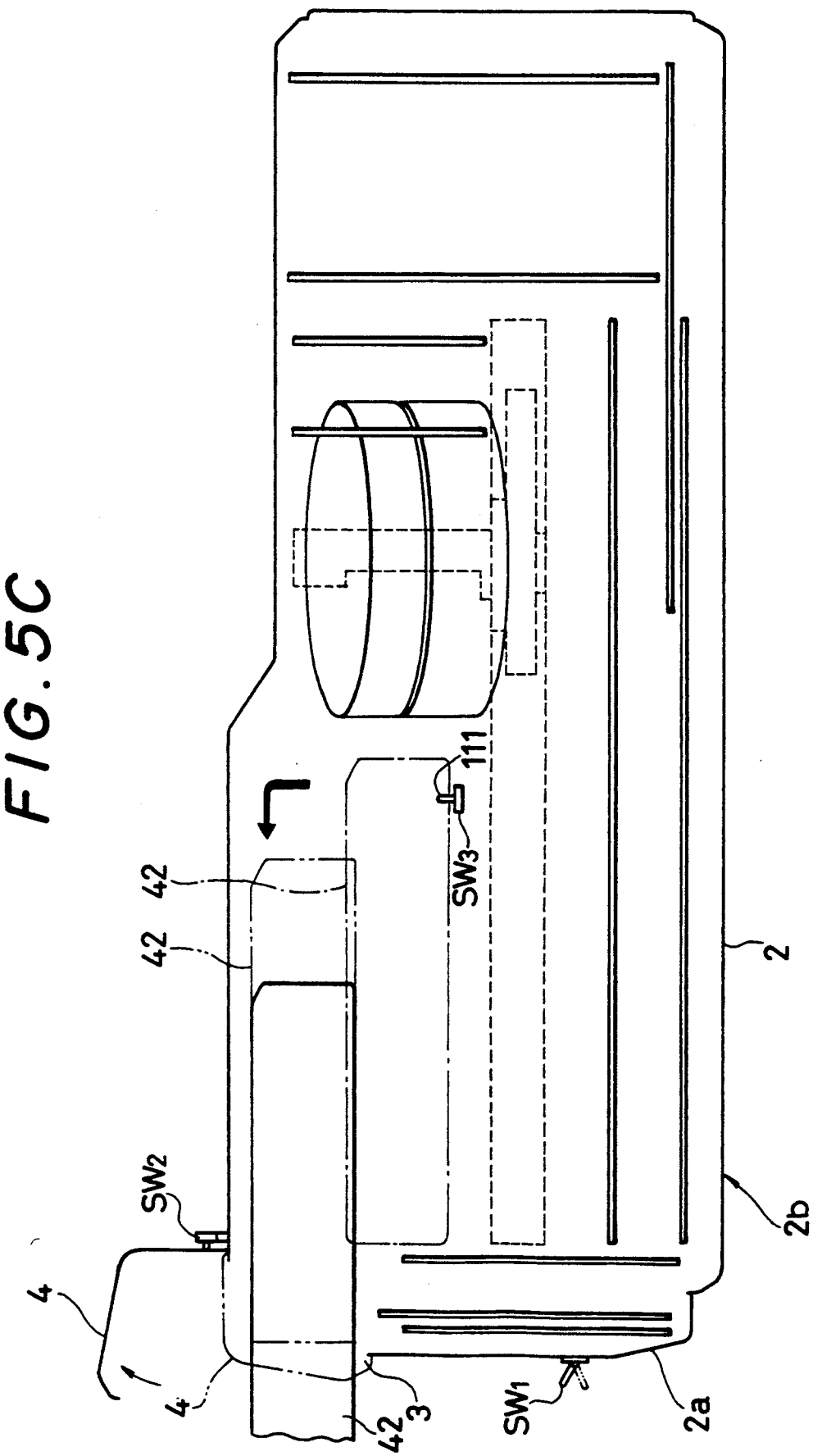

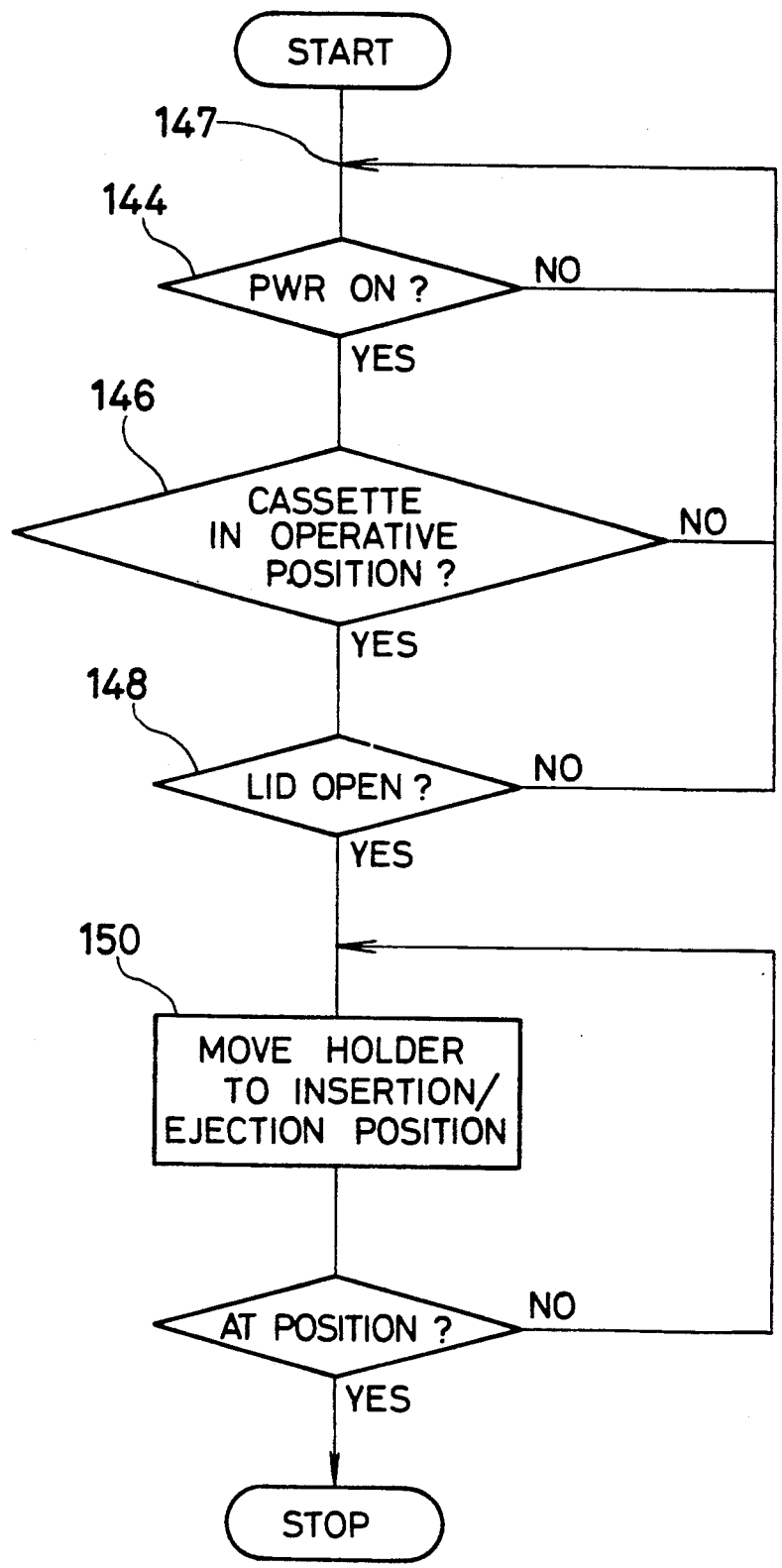

CASSETTE LOADING AND LID MECHANISMS FOR A PORTABLE VIDEO TAPE RECORDER

BACKGROUND OF THE INVENTION

1. Field of the Invention

The present invention relates generally to a portable recording and/or reproducing apparatus, such as a front-loading type video tape recorder (VTR), tape recorder, disc drive unit or the like, and, more particularly, relates to a cassette loading device for a portable video tape recorder.

2. Description of the Prior Art

In prior video tape recorders as disclosed, for example, in Japanese Utility Model Registration Application Examined Publication No. 60-25740 and Japanese Laid Open Utility Model Registration No. 63-6545, a cassette loading device includes a lid for opening and closing a cassette insertion opening which provides access to a cassette holder arranged inside the cabinet. When the cassette holder is moved to its cassette inserting position such that the cassette can be inserted through a cassette insertion slot, the lid is opened and extends inwardly into the cabinet.

The cassette holder supporting the video cassette is moved by a cassette holder driving mechanism from the cassette inserting position to a cassette operational position which is spaced rearwardly from the cassette inserting position. When the cassette is loaded in the cassette operational position, the cassette inserting opening is closed by the lid which is moved from its opened position by a lid opening and shutting mechanism which moves in unison with the movement of the cassette holder.

In this known cassette loading device, if an ejection button is pushed to remove the cassette from the cabinet, the cassette holder is returned from its cassette operational position, and prior to its return to the cassette insertion/ejection position, the lid is opened by the lid opening and shutting mechanism extending inwardly from the cassette insertion slot into the interior of the cabinet. Immediately after the cassette holder reaches the cassette inserting position, the cassette protrudes from the cabinet through the cassette insertion opening such that it can be removed by hand.

However, in these prior cassette loading devices, the lid is pushed inwardly when the cassette is inserted into the cabinet and opened by a lid opening and shutting mechanism when the cassette is removed from the cabinet. The lid is thus always opened inwardly such that particulate material, such as dust and raindrops, can easily enter the cabinet through the cassette insertion opening. This type of conventional cassette loading device is therefore unsuitable for a portable VTR which can be used outdoors.

Moreover, in such cassette loading devices, the lid opening and shutting mechanism is operatively connected to and moves in unison with the cassette holder at the time of loading and unloading the cassette into and out of the cabinet. This cassette loading device is therefore complicated to assemble and expensive to manufacture.

Additionally, since the lid opens before the cassette is moved on its return from the cassette operating position to the cassette insertion position, an extended length of time is required for the cassette to protrude outwardly from the cassette insertion opening. This undue delay permits the entry of particulate material through the opened cassette insertion opening into the cabinet.

OBJECTS AND SUMMARY OF THE INVENTION

Accordingly, it is an object of the present invention to provide an improved cassette loading device for a video tape recorder which can avoid the above problems encountered with the prior art.

More specifically, it is an object of the present invention to provide a cassette loading device for a video recorder which significantly reduces the chances that particulate material may enter the cabinet through the cassette insertion opening.

It is also an object of the present invention to provide a cassette loading device for a video tape recorder in which the lid is not operatively connected to the cassette holder.

It is another object of this invention to provide a cassette loading device for a video tape recorder wherein the time is reduced for the cassette to return from the cassette operating position to the cassette inserting position and protrude from the cabinet through the cassette insertion opening after the lid is opened.

It is a further object of the present invention to provide a cassette loading device for a video tape recorder in which the cassette is immediately ejected through the cassette insertion opening after the lid is opened.

It is yet another object of the present invention to provide a cassette loading device for a video tape recorder wherein the lid covering the cassette insertion opening extends outwardly from the cassette insertion opening in the open position thereof.

It is yet a further object of this invention to provide a cassette loading device for a video tape recorder wherein the chances of causing damage to the cassette holder or to the cassette contained therein, as by jostling during transportation of the video tape recorder, may be significantly reduced.

It is a still further object of this invention to provide a cassette loading device for a video tape recorder which is simple in construction, inexpensive to manufacture, and is compact and light.

According to an aspect of the present invention, a cassette loading device for a portable video tape recorder is provided which includes a cabinet having a cassette insertion opening which is adapted to insertably receive a video tape cassette. A lid is rotatably mounted to the housing and is movable between a first position, wherein the cassette insertion opening is closed, and a second position, wherein the cassette insertion opening is opened and the lid extends outwardly from the cassette insertion opening. A cassette holder is provided within the housing and is adapted to accept and hold a cassette inserted therein and is movable between a cassette insertion position, which is adjacent to the cassette insertion opening, and a cassette operation position, which is spaced rearwardly from the cassette inserting position. In this cassette loading device, when the lid is moved to its opened position, a lid switch is closed which, in turn, automatically moves the cassette holder from the cassette operation position to the cassette insertion position such that the video cassette protrudes outwardly from the cassette inserting opening and thus can be withdrawn therefrom by hand.

In another preferred embodiment of this invention, if the lid is closed during the return of the cassette holder from the cassette operation position to the cassette insertion position, the cassette holder is temporarily stopped in an intermediate position which is spaced rearwardly from but adjacent to the cassette insertion position along the return path of travel. If the lid is then opened, the cassette holder is moved from the intermediate position to the cassette insertion position. If the lid is in its open position during the return of the cassette holder, the cassette holder exhibits uninterrupted travel between the cassette operation position and the cassette insertion position without stopping at the intermediate position.

In accordance with another feature of the invention, a control unit is provided which controls the movement of the cassette holder in response to signals detected from a lid switch, a cassette holder position switch, and a power switch. If the lid switch is positioned in correspondence to the lid being in its closed position during return of the cassette holder, the latter is temporarily stopped in the intermediate position. When the lid switch is positioned for indicating that the lid is opened, the cassette holder is moved from the intermediate position to the cassette insertion position. The cassette holder, however, is returned without interruption from the operation position to the insertion position when the lid is opened at the inception of such return and the lid switch is correspondingly positioned.

If the cassette holder is held in its intermediate position, the control unit further detects signals which are generated from a power switch which indicates whether power is being supplied to the video tape recorder. If the power switch is turned off in a situation where the cover is closed, the cassette holder is moved from the cassette intermediate position to the cassette operation position. As a result of this arrangement, the chances that the cassette loading device and the cassette supported therein will become damaged by jostling of the cabinet during transportation are greatly reduced.

The above, and other objects, features and advantages of the present invention, will become apparent from the following description, which is to be read in conjunction with the accompanying drawings, and in which like reference numerals designate the same elements in the several views.

BRIEF DESCRIPTION OF THE DRAWINGS

FIG. 2A is a side elevational view, partly broken away and in cross-section, of a cassette loading device to be incorporated in the video tape recorder of FIG. 1 and specifically illustrating a cassette holder in its cassette insertion position;

FIG. 2B is a side elevational view partly broken away and in cross-section, which is similar to FIG. 2A but specifically illustrates the cassette holder in its cassette operation position;

FIG. 4A is a side elevational view, partly broken away and in cross-section, of a cassette loading device according to another embodiment of the invention which may be incorporated within the video tape recorder of FIG. 1, and specifically illustrating the cassette holder in its cassette insertion position;

FIG. 4C is a side elevational view, partly broken away and in cross-section, of the cassette loading device of FIGS. 4A and 4B with the cassette holder moved to its cassette operation position;

FIG. 5A is a side elevational view of a video tape recorder according to another embodiment of the present invention, and which illustrates the movement of a cassette holder from a cassette intermediate position to a cassette operation position;

FIG. 5C is a side elevational view of the video tape recorder of FIGS. 5A and 5B specifically illustrating movement of the cassette holder between the cassette operation position, cassette intermediate position and the cassette insertion position.

FIGS. 7-8 are flow charts representing the operation of the cassette loading device of the video tape recorder of FIGS. 5A-5C and 6.

DETAILED DESCRIPTION OF THE PREFERRED EMBODIMENTS

Figure 1:
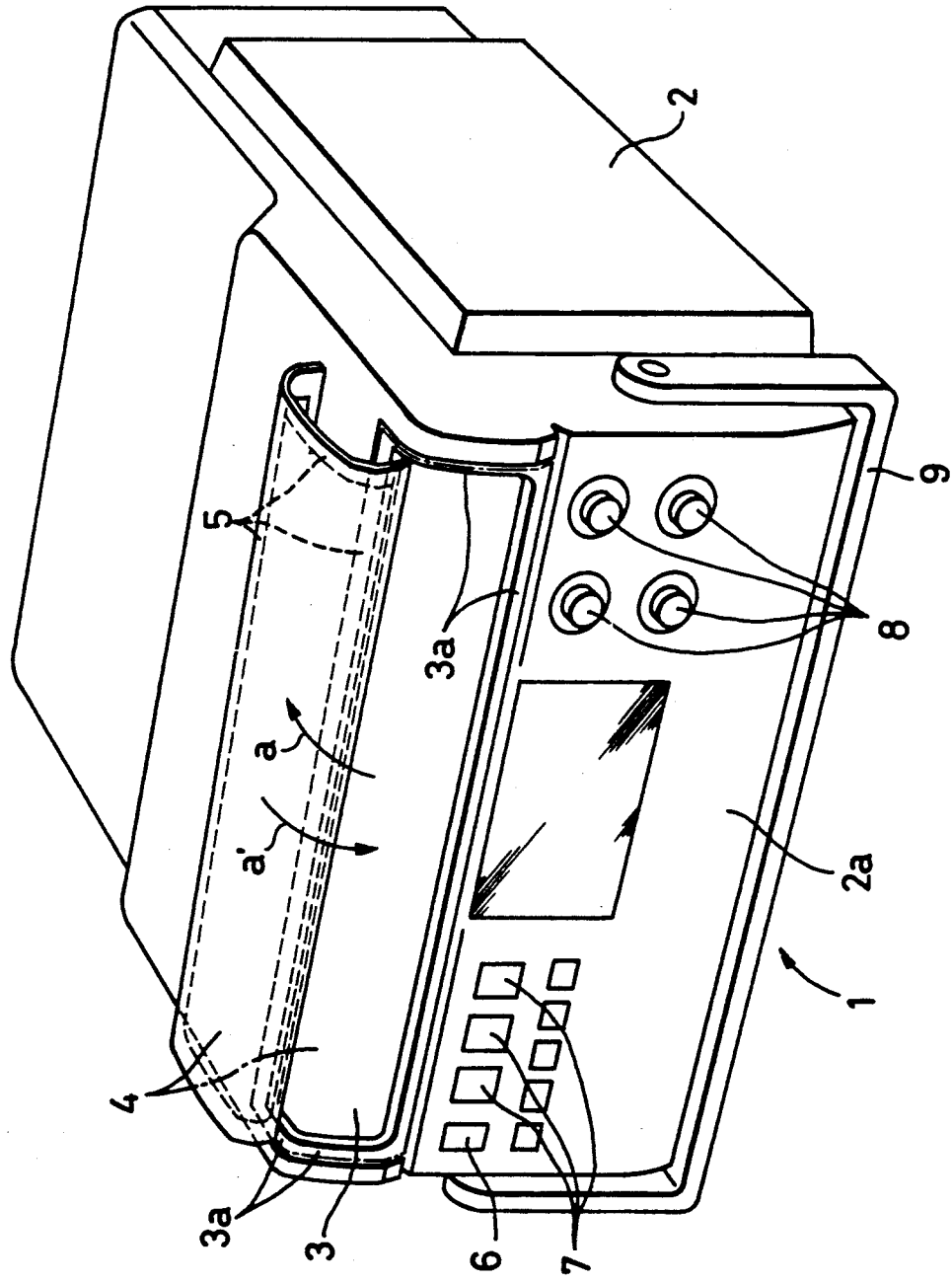
FIG. 1 is a front perspective view of a portable video tape recorder according to a preferred embodiment of this invention.

Referring initially to FIG. 1, a portable video tape recorder (VTR) 1 is shown which has a cassette insertion opening 3 extending horizontally along an upper margin of the front panel 2a of a cabinet 2. A plurality of push button controls 6, 7 and 8 such as a record button and a play button, and a plurality of other controls, such as switches and volume controls, are provided on the front panel 2a of the cabinet 2. Additionally, since the VTR of this invention is lightweight and compact, it can be transported to any desired location by grasping a handle 9 secured to the cabinet 2.

As shown in FIGS. 1, 2A-C, and 3, a lid 4 for opening and closing the cassette insertion opening 3 is pivotably mounted on the cabinet 2 for movement outwardly thereof. The lid 4 is of a generally channel-shaped cross-section and is movable in the directions of arrows a and a' between a first closed position (represented by the dot-dash lines in FIG. 1, and by the solid lines in FIG. 3), wherein the lid closes the cassette insertion opening, and a second, opened position represented by the solid lines in FIGS. 1 and 2A, and by the dot-dash lines in FIG. 3), wherein the lid 4 is pivotally extended outwardly and above the cassette insertion opening thereby permitting a cassette to be inserted within the opening. An annular rubber packing 5 is applied along the margin of the rear surface 4a of the lid. When the lid is in its closed position, the packing 5 is sealed against the outer edge 3a of the cassette insertion opening thereby preventing entry of particulate matter, such as dust or water into the interior of the cabinet through the cassette insertion opening.

Figure 3:
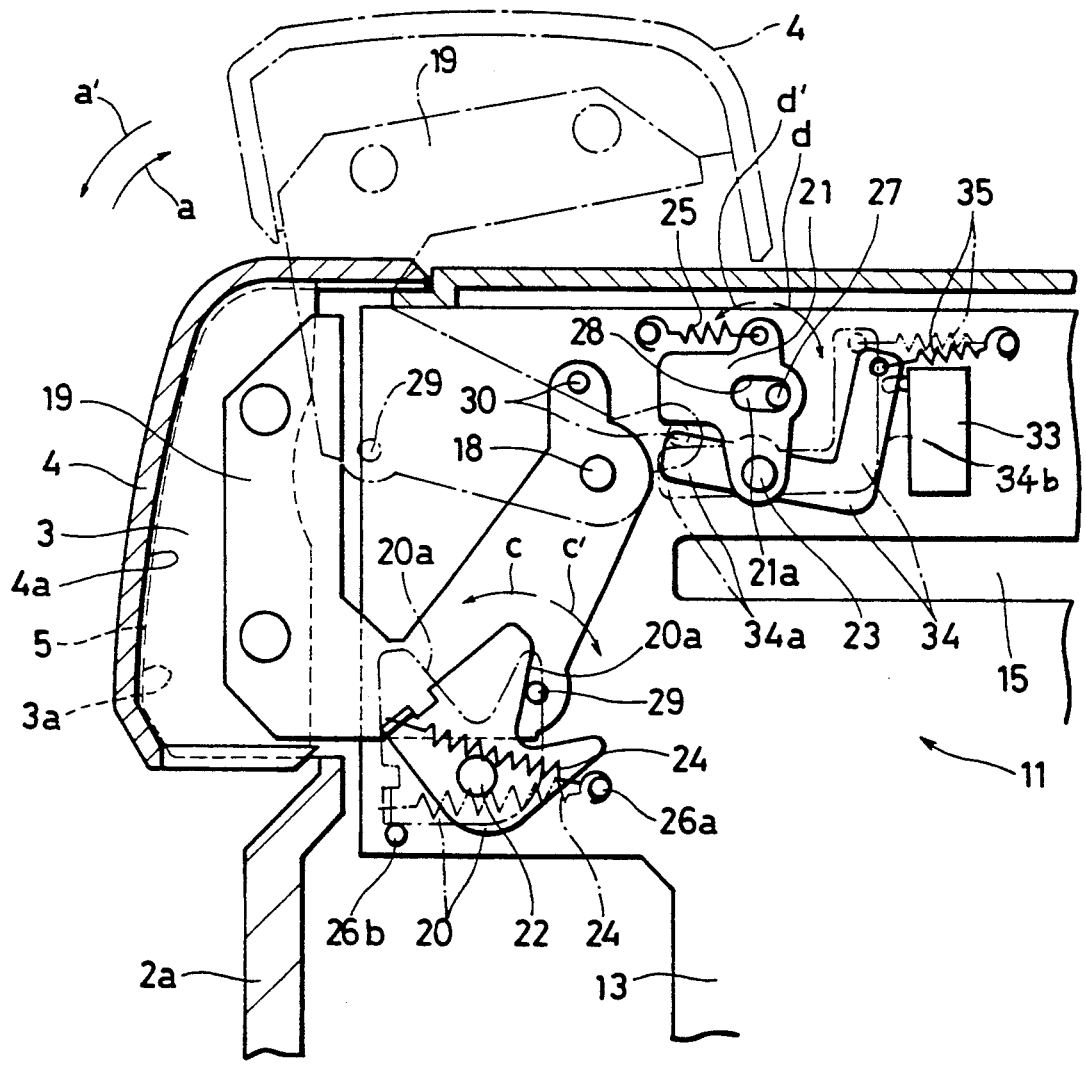
FIG. 3 is an enlarged side elevational view of the cassette loading device of FIGS. 2A and 2B, and which illustrates the operation of a lid which opens and closes a cassette insertion opening.

Referring to FIGS. 2A and 3, a cassette loading device 11 is incorporated in the cabinet 2 and includes a pair of support plates 13 which vertically extend generally parallel to each other from a base chassis 12. The cassette loading device 11 also includes a cassette holder 14 which is horizontally supported by the pair of support plates 13. When the lid 4 is in its second, opened position, a video cassette 42 may be inserted in a generally horizontal orientation into the cassette holder 14 through the cassette insertion opening 3. A plurality of inverted substantially L-shaped guide slots 15 are spaced apart in each support plate 13. Each guide slot 15 consists of a horizontal part 15a and a vertical part 15b contiguous with the horizontal part 15a. A plurality of guide rollers 16 are rotatably secured to opposite ends of the cassette holder 14 and are fitted into the guide slots 15 in the adjacent support plate so as to be rollable therein. Thus, each side of the cassette holder 14 is movably supported by the plurality of guide rollers 16 engaging in the guide slots 15 of the adjacent support plate, and the cassette holder is thereby movable in an inverted L-shaped path defined by the guide slots 15.

Accordingly, the cassette holder 14 is movable in the direction of arrows b and b' between a cassette inserting position (See FIG. 2A), which is adjacent to the cassette insertion opening 3, and a cassette operation position (See FIG. 2B) which is spaced rearwardly and downwardly in the cabinet from the cassette inserting position. The cassette holder is driven in its inverted L-shaped path by a drive mechanism 17, such as a motor, which is secured to the chassis 12 and drives the holder through an L-shaped rack and pinion, as is disclosed in U.S. Pat. No. 4,320,424.

As shown in FIGS. 2A and 2B and 3, the lid 4 is rotatably supported on the cabinet by a pair of right and left support arms 19. The support arms 19 are secured to the adjacent support plates 13 by a pair of pivot pins 18 projecting therefrom. An end portion of each of the support arms 19 is secured to the rear surface of the lid 4. Furthermore, a first locking latch 20 for locking the lid 4 in the closed position thereof, and a second latch 21 for the locking the lid in the open position thereof are mounted on one of the support plates 13. The latches 20 and 21 are rotatable in directions represented by arrows c, c' and d, d' respectively, about pivot pins 22 and 23. The first latch 20 is urged clockwise in the direction of arrow c' and the second latch 21 is urged counterclockwise in the direction of arrow d' by forces applied by return springs 24 and 25 so as to abut against stop members 26a and 27, respectively. As illustrated in FIGS. 2A-B and 3 the stop member 27 is loosely fitted in an elongated hole 21a provided in the latch 21. As will be discussed in more detail below, a pair of pin members 29 and 30 which project from one of the supporter arms 19 are capable of engagement with the first and second latches 20 and 21, respectively.

As shown in FIG. 3, a first ejection switch 33 for detecting whether the lid 4 is in its open position is mounted on one of the support plates 13. The switch 33 is automatically operated when the lid 4 is moved into the open position thereof. The ejection switch 33 may be constituted by a microswitch, which is closed or turned on when it is not engaged by a rockable first substantially L-shaped switch operating lever 34. This operating lever 34 has a substantially horizontal arm 34a and a substantially vertical arm 34b. The lever 34 is rockably mounted on the pivot pin 23 of the latch 21. The switch operating lever 34 is normally urged in a clockwise direction (See FIG. 3) by the force applied to it by a return spring 35 so that the substantially vertical arm 34b abuts against the ejection switch 33 to open the switch to is OFF position. When the lid is moved to the open position thereof, the pin member 30 contacts the horizontal arm 34a of the lever 34 and rocks the latter in the counterclockwise direction of arrow d' thereby disengaging the substantially vertical arm 34b from ejection switch 33. In this position, the ejection switch is closed and thus is in its ON position.

Referring to FIGS. 2A and 2B, and to the sequence of operation of the above-described cassette loading device, the cassette holder 14 is initially located at the upper cassette insertion/ejection position, as shown in FIG. 2A. When the lid 4 is its first closed position thereby closing the cassette insertion opening 3 (See FIG. 3), the pin member 29 is fitted in a V-shaped groove 20a of the latch 20. The lid 4 is thereby urged counterclockwise in the direction of the arrow a' by the biasing force exerted on the latch 20 by the return spring 24. Accordingly, the rubber packing 5 is pressed against the outer edge 3a of the cassette insertion opening 3 thereby sealing the opening 3 so as to be impervious to particulate material from the outside, such as dust and raindrops.

When the lid is moved to its opened position, the cassette insertion opening 3 is opened (See FIG. 2A), and the pin member 30 on support arm 19 is pressed against the underside of the latch 21 due to the biasing applied by return spring 2 such that the lid is locked in its open position thereof extending upwardly and outwardly from the cassette insertion opening 3. Simultaneously therewith, the pin member 30 contacts the substantially horizontal arm 34a of lever 34 such that the lever 34 is rotated counterclockwise in the direction of arrow d' to disengage the substantially vertical arm 34b of lever 34 from the ejection switch 33. Thus, in this position, the ejection switch is closed and is in its ON-position.

Additionally, as the lid 4 is rotated clockwise in the direction of arrow a from its closed position to its open position, the first latch 20 is pushed by pin 29, and rotated counterclockwise in the direction of arrow c to a point at which the return spring 24 reaches its maximum extension. Thereafter, the latch 20 is rotated in a counter clockwise direction as represented by arrow c due to the force of the return spring 24 which has passed the point of maximum extension, and thus, the latch 20 is brought into contact with a stop member 26b.

If the lid 4 is moved counterclockwise in the direction of arrow a' from the open position thereof to the closed position, the pin member 30 on support arm 19 is disengaged from between the latch 21 and the switch operating lever 34, as shown in FIGS. 2B and 3. The switch operating lever 34 is thus rotated clockwise in the direction of arrow d due to the biasing force applied on the lever by the return spring 35. In this position, the ejection switch 33 is engaged by the substantially vertical arm 34b of the lever 34. Thus, in the lid closed position the ejection switch 33 is opened or in its OFF position.

As the lid 4 is rotated counterclockwise and approaches its closed position, the pin member 29 of the support arm 19 is again fitted in the V-shaped groove 20a of the latch 20. This pin member 29 rotates the latch 20 clockwise in the direction of arrow c' until the return spring 24 has passed through its point of maximum extension. The latch 20 thus locks the lid in its closed position.

When a cassette 42 is to be loaded, the lid is moved clockwise towards its open position (See FIG. 2A) such that the cassette 42 can be horizontally inserted in the direction of arrow f through the cassette insertion opening 3. The cassette is thus mounted in the cassette holder 14 which has been returned to the cassette inserting position thereof.

At this time, a detector (not shown) generates a signal indicating whether the cassette 42 has been properly mounted in the cassette holder, and in response to that signal, the motor 17 is rotated to move the cassette holder 14 in the direction of arrow b from the cassette insertion position (FIG. 2A) to the cassette operation position (FIG. 2B). In the cassette operation position of the cassette holder 14, the cassette is horizontally mounted on a pair of reel tables (not shown) such that the cassette is ready for a tape loading operation.

When the lid 4 is moved to its open position thereof so as to permit removal of the cassette 42 from the cassette holder 14, the ejection switch 33 is closed or in its ON-position. In response to a signal indicating that the switch 33 shows the lid 4 to be in its open position, the motor 17 is rotated in a reverse direction such that the cassette holder 14 is returned in the direction of arrow b' from the cassette operation position to the cassette insertion position. In the cassette insertion position, the rear end 42a of the cassette 42 protrudes from the cabinet 2 through the cassette insertion opening 3. Thereafter, the motor 17 is stopped in response to a signal from a detector switch (not shown) which detects that the cassette holder 14 has returned to its cassette insertion position. Thus, the operator can easily remove the cassette 42 by hand.

In the above-described cassette loading device 11, in order to move the cassette holder from its operative position to the insertion position such that the cassette can be withdrawn through the cassette insertion opening, it is only necessary to lift the lid 4 by hand to its open position. The previous two-step operation of pushing an ejection button and also opening the lid 4 are not required to remove the cassette from the cabinet. Thus, in accordance with an object of this invention, less time is consumed to withdraw the cassette after it has been loaded in the cassette operation position of the cassette holder insertion.

By a way of summary of the embodiment illustrated in FIGS. 2A-B and 3, it is to be noted that, in accordance with this invention, the lid 4 is opened upwardly outside the cabinet 2, so as to overhang the cassette insertion opening 3, so that the entry of particulate material into the cabinet through the cassette insertion opening is significantly reduced. When the lid is so opened, the driving mechanism 17 is driven in response to a signal received from the closed ejection switch 33, and the cassette holder 14 is automatically returned from the cassette operation position to the cassette insertion position such that the cassette can be withdrawn from the cassette holder.

Figure 4B:
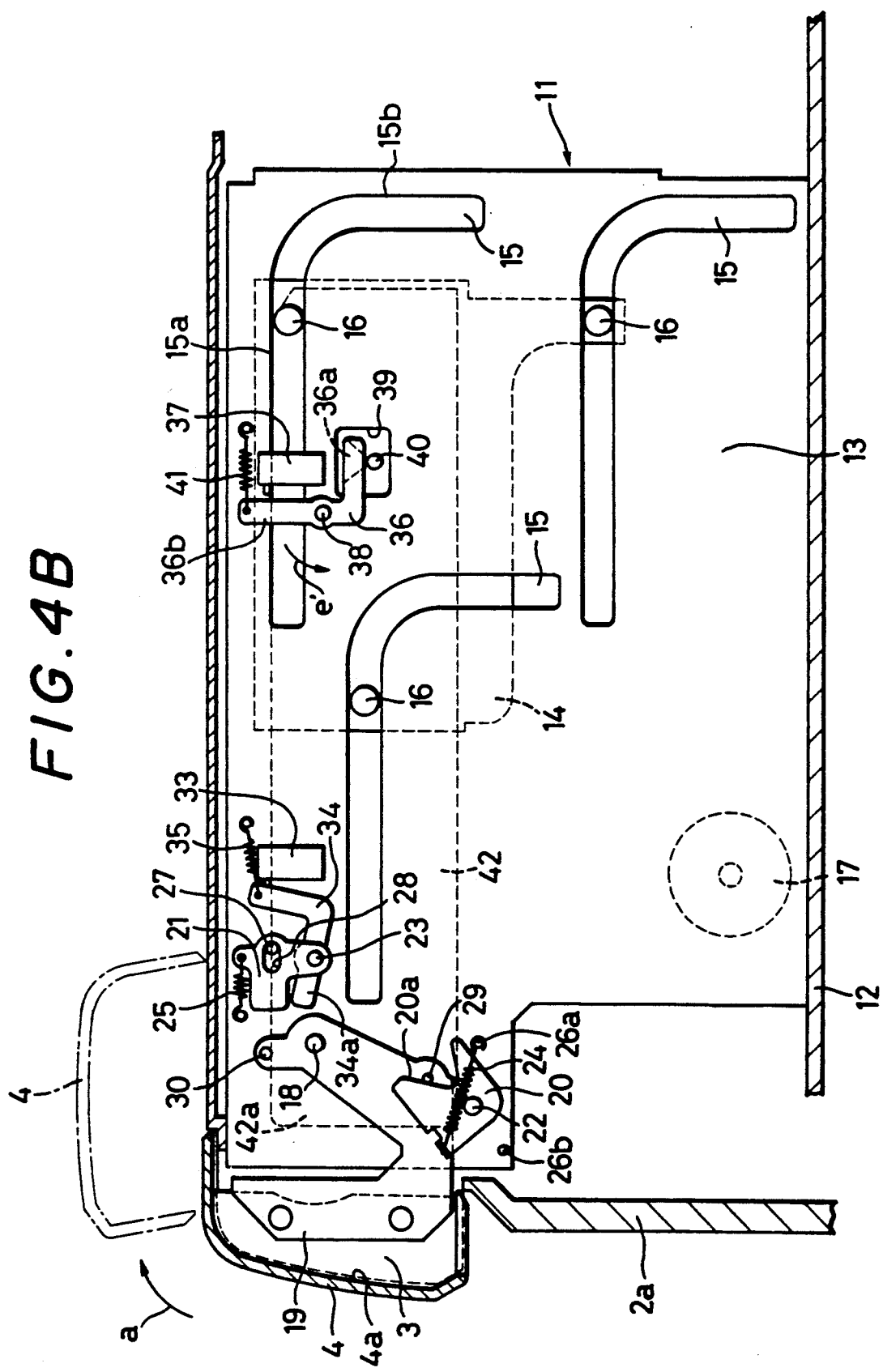
FIG. 4B is a side elevational view, partly broken away and in cross-section, of the cassette loading device of FIG. 4A with the cassette holder moved to its cassette intermediate position.

Another preferred embodiment of a cassette loading device for a video tape recorder according to the present invention, is illustrated in FIGS. 4A-C. Those features in FIGS. 4A-C which have been previously discussed in relation to the embodiment of FIGS. 2A-B and 3, will not be discussed in further detail below.

In this second preferred embodiment, if the lid 4 is in its closed position, the cassette holder 14 is temporarily stopped in an intermediate position (See FIG. 4B) located between the cassette operation position and cassette insertion position during the return of the cassette holder. The cassette holder is again moved to the cassette insertion position from the cassette operation position as soon as the lid reaches its open position.

In addition to the first ejection switch 33, which detects whether the lid is in the open position, a second switch 37 is provided for temporarily stopping the cassette holder 14 in the intermediate position, and the switch 37 is also secured to one of the support plates 13 of the cassette loading device.

As shown in FIGS. 4A-C, a second, substantially L-shaped switch operating lever 36, having a substantially horizontal arm 36a and a substantially vertical arm 35b, is rotatably supported by a horizontal support pin 38 affixed to one of the support plates 13 adjacent to the second switch 37. The second switch operating lever 36 is urged clockwise in the direction of arrow e by the biasing force applied by a return spring 41. The second lever 36 is thereby pressed against the second switch 37. Furthermore, the substantially horizontal arm 36a of the second lever 35 projects into the interior of the support plate 13 through a hole 39 provided therein. The horizontal arm 36a is capable of engagement with a pin member 40 (See FIG. 4B) which projects from one of the side plates of the cassette holder 14.

In addition to the operation of the cassette loading device discussed in FIGS. 2A-B and 3, if an ejection button 6 (FIG. 1) is pushed to remove the cassette, the motor 17 is rotated in its reverse direction, and the cassette holder 14 travels in its return path from the cassette operation position (FIG. 4C) to the cassette insertion position (FIG. 4A). Before the cassette holder 14 reaches the cassette insertion position, if the lid 4 is closed, the cassette holder temporarily stops in an intermediate position as shown in FIG. 4B. The intermediate position is adjacent to, but spaced rearwardly from the cassette inserting position so that the rear end 42a of the cassette 42 is positioned close to but inwardly of the cassette insertion opening 3.

In order to temporarily stop the cassette holder in the intermediate position, the pin member 40 on the cassette holder 14 abuts against the substantially horizontal arm 36a of the second lever 36. The second lever 36 is thus rotated counterclockwise in the direction of the arrow e' against the biasing force of the return spring 41 which, in turn, disengages the substantially vertical arm 36b of the lever 36 from the second switch 37. Accordingly, the second switch 37 is closed or in its ON-position so that the motor 17 is temporarily stopped thereby locating the cassette holder 14 in its intermediate position.

Thereafter, if the lid 4 is opened by hand and moved to its open position remote from the cassette insertion opening 3, the first switch 33 is closed or moved to its ON-position as previously discussed. In this situation, the motor 17 is again rotated in its reverse direction such that the cassette holder 14 is moved from the cassette intermediate position to the cassette insertion position of FIG. 4A. Thus, the rear end 42a of the cassette 42 protrudes from the cabinet through the cassette insertion opening 3 so that it can be withdrawn.

In addition, the first switch 33 and the second switch 37 configure an AND circuit such that if the lid 4 is in its opened position, the cassette holder is uninterrupted in its return path of travel from the cassette operation position to the cassette insertion position, and hence, does not stop at its intermediate position. Therefore, the time required to remove the cassette from the cassette operation position is significantly shortened.

By way of summary, in this second preferred embodiment illustrated in FIGS. 4A-C, when the cassette is to removed, if the lid is closed, the cassette holder is temporarily stopped in its intermediate position which is adjacent to, but spaced rearwardly from the cassette insertion position during movement of the cassette holder from the cassette loading position toward the cassette inserting position. After the lid is opened, the cassette holder is automatically moved from the intermediate position to the cassette inserting position such that the cassette protrudes from the cabinet through the cassette insertion opening. In such position, the cassette can be withdrawn by hand from the cabinet. If, however, the lid is opened to begin with, the cassette holder does not halt at its intermediate position and returns directly from the cassette operation position to the cassette insertion position. Accordingly, if the lid is closed when movement of the holder toward the cassette insertion position is initiated, this cassette loading device makes it possible to shorten the time in which the cassette insertion opening is free of the lid when removing the cassette. Accordingly, the chances that particulate material will enter the cabinet through the cassette insertion opening are significantly reduced.

Another embodiment of the present invention is illustrated in FIGS. 5A-C and 6. This embodiment is patterned after the embodiment described with reference to FIGS. 4A-C except that it includes a power switch SW1, a cover switch SW2 and a cassette holder position switch SW3. The operational interrelationship of these three switches is discussed in further detail below. In accordance with an aspect of this invention, this embodiment minimizes the chances that the cassette holder or cassette will be damaged due to jostling during transportation of the portable VTR.

Figure 5B:
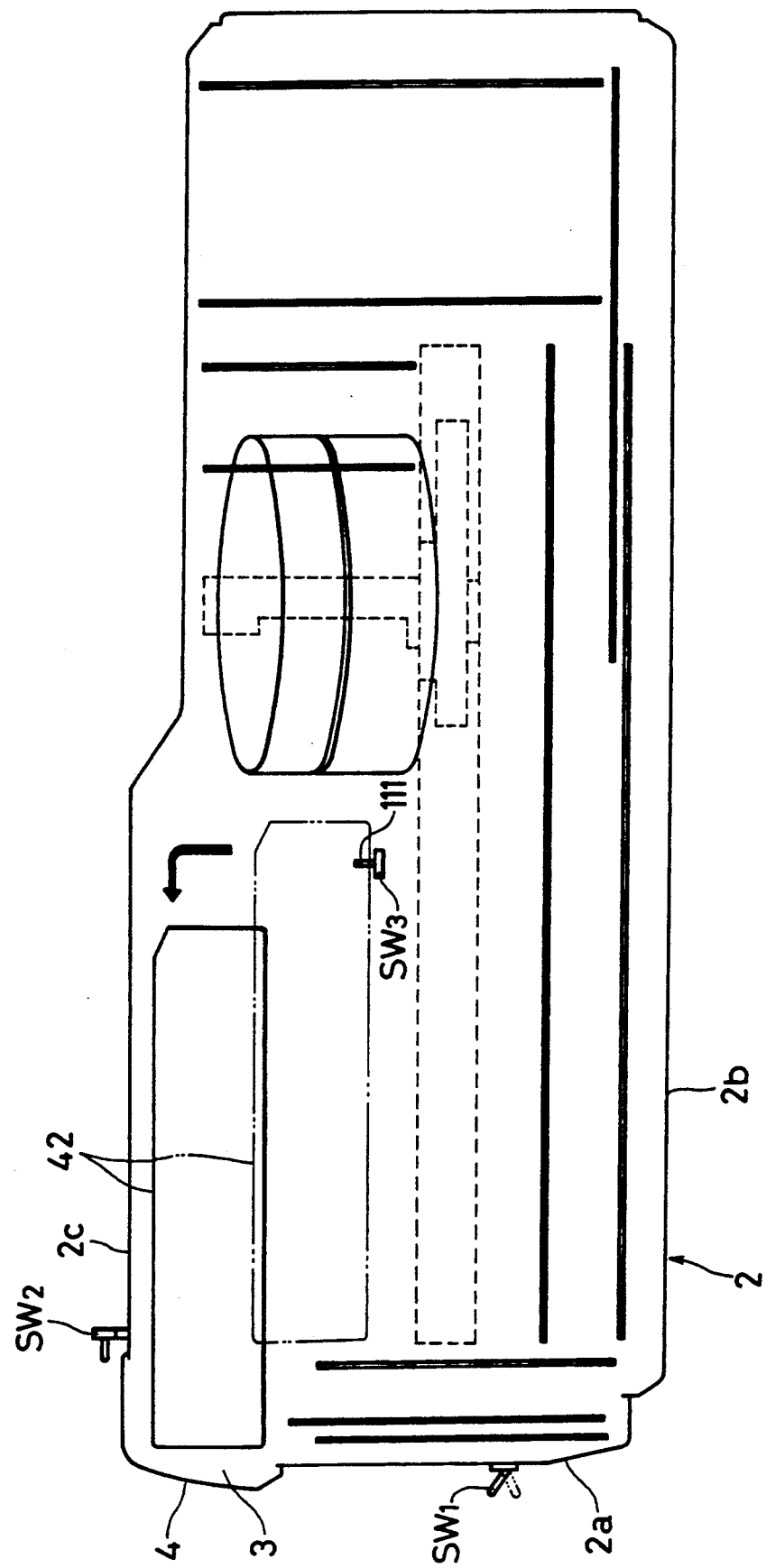
FIG. 5B is a side elevational view of the video tape recorder of FIG. 5A specifically illustrating movement of the cassette holder from the cassette operation position to the cassette intermediate position.

In this embodiment, as illustrated in FIGS. 5A-C, a portable VTR is housed in a cabinet 2 including a case body 2b and a front panel 2a disposed forwardly of the case body 2b. On the front panel 2a, there is a power switch SW1 which is movable between an ON-position represented by a solid line in FIGS. 5A-C and an OFF-position represented by the dotted line in FIGS. 5A-C.

A cover switch SW2 is provided at the top surface 2c of cabinet 2. The cover switch SW2 detects whether the lid 4 is in its opened position or in its closed position. The cover switch SW2 is in its OFF-position when the lid 4 is in its closed position covering the cassette insertion slot as shown in FIGS. 5A and 5B or is in its ON-position when the lid 4 is in its opened position, exposing the cassette insertion slot, as shown in FIG. 5C.

As aforementioned in relation to the embodiment of FIGS. 4A-C, the cassette loading device includes a cassette holder (not shown in FIGS. 5A-C) for holding the cassette 42 therein which is driven by a motor 105 (shown in FIG. 6) for movement between a cassette insertion position represented by a solid line in FIG. 5C and a cassette operation position, as shown in solid lines in FIG. 5A. As is shown in the solid line in FIG. 5B, during the return of the cassette holder from the cassette operation position to the cassette insertion position, the cassette holder is temporarily stopped in the cassette intermediate position wherein the rear end of the cassette 42a is proximate to the lid 4. At the cassette insertion position, the cassette 42 held in the cassette holder projects therefrom through the slot 3 and can be withdrawn from the holder through the slot 3. Meanwhile, at the cassette operation position, the cassette 42 is mounted on reel tables (not shown) such that the cassette is ready for a tape loading operation. The reel tables are furnished with a brake mechanism (not shown) for inhibiting rotation of the reel tables, and this reel brake mechanism is actuated by the driving force from a plunger or solenoid 106 illustrated in FIG. 6.

The cassette holder position switch SW3 is provided a for detecting whether the cassette holder is in its cassette operation position. The position switch SW3 is actuated to be turned ON or OFF in accordance with the position of its upwardly extending rod 111. The switch SW3 is closed and in its ON-position when the cassette holder is in its cassette operation position as shown in FIG. 5A with the rod 111 forced downwardly. The switch SW3 is in its OFF-position when the cassette holder is in any other position than the cassette operation position, such as those positions shown in full lines in FIGS. 5B-C.

Figure 6:
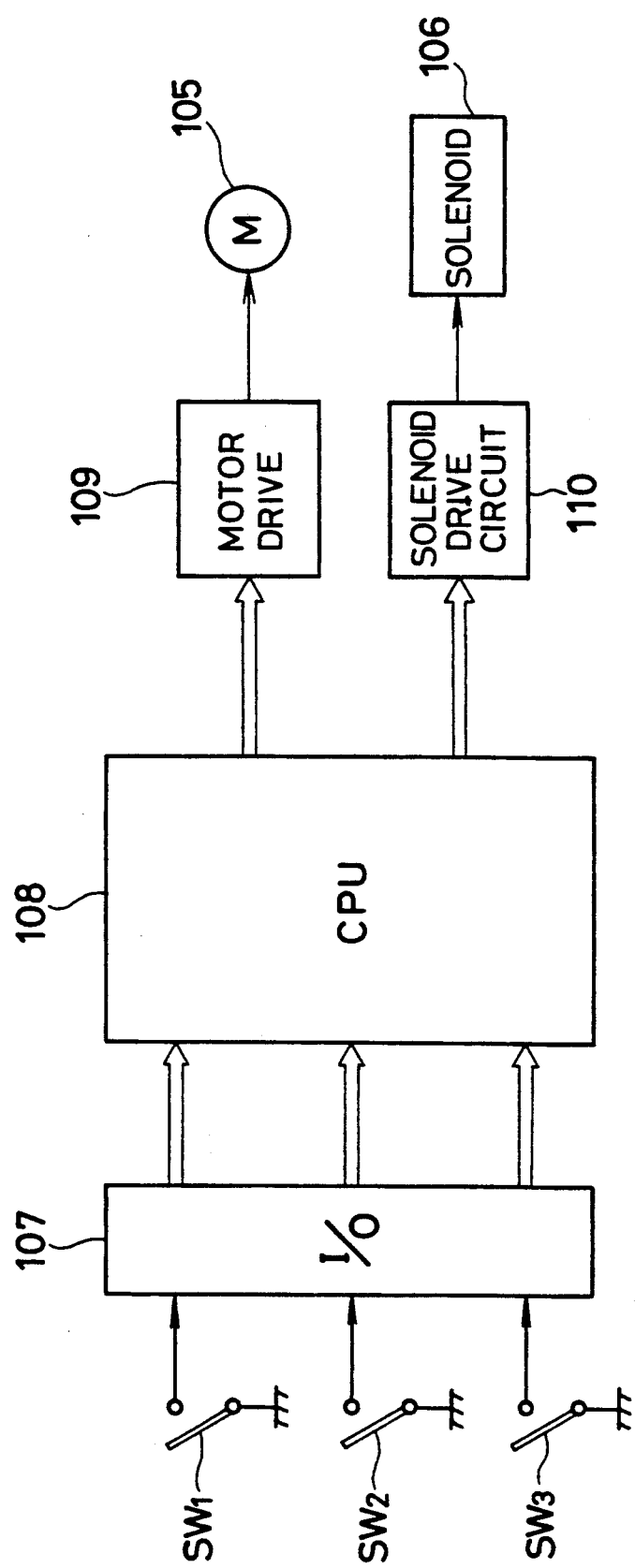
FIG. 6 is a block diagram of a control circuit for a cassette loading device included in the video tape recorder of FIGS. 5A-5C.

The switches SW1, SW2, and SW3 are further illustrated in the block diagram of FIG. 6. In this diagram, outputs of the power switch SW1, the lid switch SW2 and the cassette holder position switch SW3 are shown to be supplied through an input/output (I/O) circuit or interface 107 to a central processing unit (CPU) 108. The CPU 108 may receive various other input signals in addition to the switch outputs and controls a motor driving circuit 109, and a plunger or solenoid driving circuit 110 in response to the input signals. The specific details of each control operation will be described below. The motor driving circuit 109 produces a driving signal in accordance with the respective control signal and feeds the output to the motor 105. The plunger or solenoid driving circuit 110 produces a driving signal in accordance with the respective control signal and feeds the output to the plunger or solenoid 106.

In order to insert the cassette 42 through the cassette insertion opening 3, the cover lid 4 is initially placed at its open position so that the cover switch SW2 is in its ON position. When the cassette 42 is inserted in the cassette holder to its cassette insertion position, the position switch SW3 is in its OFF-position. Upon full insertion of the cassette into the holder, the motor 105 of the cassette holder driving mechanism is then energized in response to a control signal received from the CPU 108, whereby the cassette holder is moved from the cassette insertion position to the cassette operation position. When the rear end 42a of the cassette has advanced into the cabinet, the operator manually swings the lid 4 to its closed position covering the cassette insertion slot 3. In the cassette operation position, the cassette is loaded on reel tables (not shown) and the switch SW3 is closed or actuated to its ON-position. When a recording mode is selected, the magnetic tape contained within the cassette is withdrawn therefrom in a loading operation and is then driven by the usual capstan (not shown) and by rotation of the reel tables such that magnetic recording/reproduction is performed on the tape.

Figure 7:
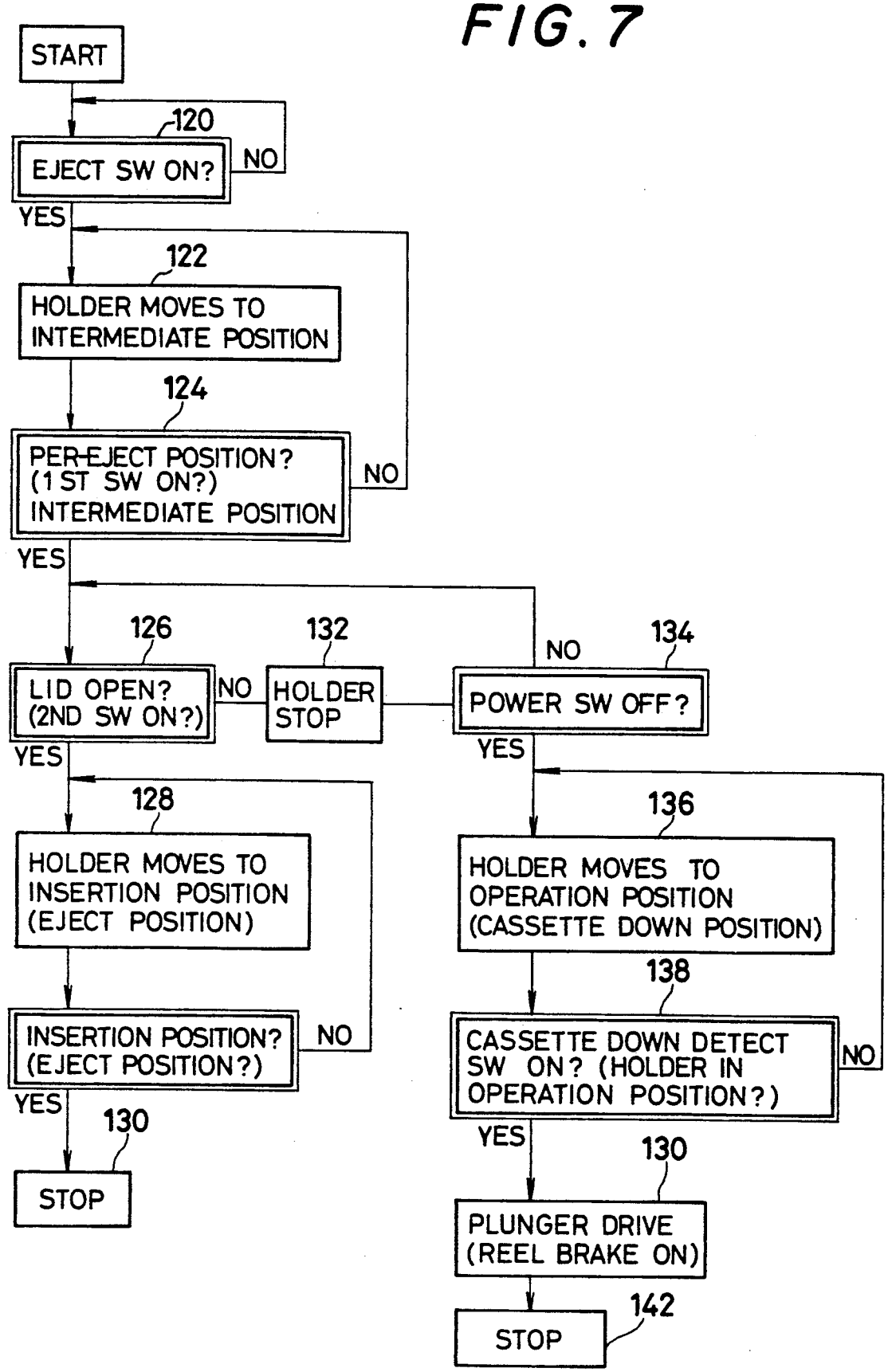

As indicated by the sequence of operations represented by the flow chart of FIG. 7, when it is desired to withdraw the cassette, an eject mode is selected by actuation of an eject switch on the control panel, as in step 120, after selection of the stop mode. In the next step 122, the motor 105 of the cassette holder driving mechanism is energized in response to the control signal received from the CPU 108, whereby the cassette holder is moved from the cassette operation position toward the intermediate position. At step 124, an inquiry is made as to whether the cassette holder has attained the intermediate position. If it has not, movement of the holder to the intermediate position is continued.

If it is determined in step 124 that the cassette holder has reached the intermediate position, the program proceeds to step 126 in which it is determined whether the lid is in its opened or closed position as indicated by the condition of the cover switch SW2. If the cover switch SW2 is closed or in its ON-condition, thereby indicating that the lid or cover 4 is open, the cassette holder is moved further from the cassette operation position to the cassette insertion position, as at step 128, without having its movement interrupted at the intermediate position. After the cassette 42 has been withdrawn through the cassette insertion slot 3 from the holder of the cassette insertion position, the operator closes the lid 104 manually, and the sequence is completed at step 130.

If the cover 4 is in its closed position at step 126, the cover switch SW2 is opened or in its OFF-condition, and, in response thereto, the cassette holder is temporarily stopped in the intermediate position, as at step 132. An inquiry is then made in step 134 as to whether the power switch SW1 is in its ON or OFF condition. If the power switch SW1 is in its ON-condition, the routine returns to step 126 and an inquiry is made again to determine whether the lid or cover 4 is opened or closed. If the lid or cover 4 is opened, the cover switch SW2 is closed or in its ON-condition, and, in response thereto, the cassette holder is moved from the intermediate position to the cassette insertion position where the cassette may be withdrawn through the cassette insertion slot 3.

When the power switch SW1 is determined to be in the OFF-position at step 134, the program proceeds to the step 136 in which the cassette holder is moved back to its operation position. Then, in step 138, it is determined whether the cassette position switch SW3 is in its ON or OFF position for indicating whether the cassette holder has returned fully to its operation position. If the cassette holder position switch SW3 is in its ON-position to indicate that the cassette holder is in the cassette operation position, the CPU 108 feeds a control signal to the plunger or solenoid driving circuit 110 at step 140, thereby driving the plunger or solenoid 106 to brake the reel tables. On the other hand, if the cassette holder position switch SW3 is in its OFF-position indicating that the cassette holder is at a location other than the cassette operation position, the CPU 108 responds to the negative answer at step 138 to provide a control signal to the motor driving circuit 109 by which the motor 105 is made to move the cassette holder to the cassette operation position, as at step 136, and the cycle is repeated. After the reel tables are braked, at step 130, the power supply is turned off in the concluding step 142

As is indicated in FIG. 7, if the power switch SW1 is turned off in a situation where the lid 4 is closed, for example, if the power switch SW1 is turned off with the cassette 42 loaded in the VTR, indicating that the operator has no intention of withdrawing the cassette 42, then the cassette holder is shifted to the stable cassette operation position shown in full lines on FIG. 5A and, thereafter, the power supply is turned off. Since the cassette 42 is fixedly secured in the cassette operation position and the power is turned off, the chances of causing damage to the cassette holder or the cassette itself are significantly decreased if jostling occurs during transportation of the VTR.

FIG. 8 is a flow chart representing another embodiment of the invention in which movement of the cassette holder back to the cassette insertion position is made to occur in response to opening of the lid 4 rather than in response to actuation of the ejection switch, as in FIG. 7. At the start of the program shown on FIG. 8, an inquiry is made in step 144 as to whether the power switch is on. If the power switch is on, the CPU 108 detects in step 146 whether the cassette holder is in its cassette operation position. If the power is off, or the cassette holder is not in its cassette operation position, the program reverts to its starting point 147. If the cassette holder is in its cassette operation position, the program proceeds to step 148 where it is determined whether the lid 4 is in its opened position. If the lid is determined to be closed in step 148, the cycle reverts back to the starting point 147. If the lid is open, the cassette holder is made to move directly from its cassette operation position to the cassette insertion position, in step 150. When the cassette holder is properly positioned in the cassette insertion position, the cassette can be withdrawn through the open cassette insertion slot. The power is then turned off to stop the sequence.

Although preferred embodiments of the invention have been described in detail herein with reference to the accompanying drawings, it is to be understood that the present invention is not limited to those precise embodiments, and that many changes and modifications could be effected therein by one skilled in the art without departing from the spirit and scope of the invention as defined in the appended claims.

What is claimed is:

1. A cassette loading apparatus for a video tape recorder comprising:

a cabinet having a front panel with a cassette insertion opening therein which is a adapted to insertably receive a video cassette;

a lid disposed to open outwardly from said cassette insertion opening and being pivotally mounted in respect to said cabinet for movement between a first position, wherein said cassette insertion opening is closed, and a second position, wherein said cassette insertion opening is unobstructed by said lid;

cassette holding means within said cabinet operative to accept and hold said cassette inserted therein and being movable between a cassette insertion position, which is adjacent to said cassette insertion opening, and a cassette operation position, spaced rearwardly and downwardly from said cassette insertion position;

drive means for moving said cassette holding means between said cassette insertion position and said cassette operation position; and switch means responsive to the position of said lid for actuating said drive means when said lid is moved to said second position so that said cassette holding means is moved by said drive means from said cassette operating position to said cassette insertion position.

2. The cassette loading apparatus for a video tape recorder as in claim 1; further comprising:

a chassis mounted in said cabinet; and a pair of support plates vertically projecting from said chassis with said cassette holding means being horizontally supported between said pair of support plates.

3. The cassette loading apparatus for a video tape recorder as in claim 2; further comprising, on one of said support plates, a pivotable first latch for releasably holding said lid in said first position and a pivotable second latch for releasably holding said lid in said second position.

4. The cassette loading apparatus for a video tape recorder as in claim 3; wherein said lid has a pair of arms vertically extending therefrom and pivotally connected to said support plates for effecting the pivotal mounting of the lid on said cabinet, one of said arms having a pair of pin members projecting therefrom and which are capable of engaging said first and second latches, respectively.

5. The cassette loading apparatus for a video tape recorder as in claim 4; further comprising first and second stop means, and first and second biasing means urging said first and second latches against said first and second stop means, respectively.

6. The cassette loading apparatus for a video tape recorder as in claim 5; wherein said second latch has an elongated hole which receives said second stop means.

7. The cassette loading apparatus for a video tape recorder as in claim 6; wherein said switch means includes an ejection switch secured to said one of the support plates and being actuable by a first lever means which is pivotable about a pivot axis of said second latch, and third biasing means urging said first lever means against said ejection switch for actuating the latter; and wherein one of said pin members acts on said first lever means for disengaging the latter from said ejection switch in response to movement of said lid to said second position thereof.

8. The cassette loading apparatus for a video tape recorder as in claim 7; wherein said first latch has a V-shaped groove in which the other of said pin members engages as said lid is moved to said first position such that said lid closely confines said cassette insertion opening by a force applied by said first biasing means to said first latch.

9. The cassette loading apparatus for a video tape recorder as in claim 8; wherein movement of the lid towards said second position urges said one pin member against said second latch by a force of said second biasing means applied to said second latch as said lid is moved to said second position and, simultaneously therewith, said one pin member contacts said first lever means for disengaging the latter from said ejection switch and thereby closing said ejection switch.

10. The cassette loading apparatus for a video tape recorder of claim 9; wherein said one pin member is disengaged from said second latch and said first lever means as said lid is moved from said second position to said first position so that said first lever means is rotated clockwise at the urging of said first bias means for engaging said ejection switch and thereby opening said ejection switch.

11. A cassette loading apparatus for a video tape recorder comprising:
a cabinet having a front panel with a cassette insertion opening therein which is adapted to insertably receive a video tape cassette;
a lid disposed to open outwardly from said cassette insertion opening and movable between a first position, wherein said cassette insertion opening is closed, and a second position, wherein said cassette insertion opening is opened;
cassette holding means adapted to accept and hold a cassette inserted therein and being movable between a cassette insertion position which is adjacent to said cassette insertion opening, and a cassette operation position which is spaced rearwardly and downwardly from said cassette insertion position through a cassette intermediate position between said cassette insertion and operation positions;
drive means for moving said cassette holding means between said cassette insertion position, said cassette intermediate position, and said cassette loading position;
first switch means for controlling said drive means;
means for closing said first switch means when said lid is moved to its second position;
second switch means adapted to be closed for temporarily stopping said drive means if said first switch means is then opened;
means for closing said second switch means when said cassette holding means is moved to said cassette intermediate position; and
control means for causing said drive means to move said cassette holding means from said cassette operation position past said cassette intermediate position to said cassette insertion position when both said first and second switch means are closed.

12. The cassette loading apparatus for a video tape recorder as in claim 11; and further including:
a chassis mounted in said cabinet;
a pair of support plates vertically projecting from said chassis; and
means horizontally supporting said cassette holding means between said pair of support plates.

13. The cassette loading apparatus for a video tape recorder as in claim 12; further comprising a pivotable first latch for holding said lid in said first position, a pivotable second latch for holding said lid in said second position, and means mounting both of said latches on one of said support plates.

14. The cassette loading apparatus for a video tape recorder as in claim 13; wherein said lid has a pair of arms vertically extending therefrom and being pivotably connected to said support plates, one of said arms having a pair of pin members projecting therefrom which are engageable with said first and second latches, respectively.

15. The cassette loading apparatus for a video tape recorder as in claim 14; further comprising first and second stop means, and first and second biasing means urging said first and second latches against said first and second stop means, respectively.

16. The cassette loading apparatus for a video tape recorder as in claim 15; wherein said second latch has an elongated hole which receives said second stop means.

17. The cassette loading apparatus for a video tape recorder as in claim 16; wherein said first and second switch means are both mounted on one of said support plates.

18. The cassette loading apparatus for a video tape recorder as in claim 17; further first and second lever means rockably mounted on said one support plate adjacent to said first and second switch means, respectively.

19. The cassette loading apparatus for a video tape recorder as in claim 18; further comprising third and fourth biasing means by which said first and second lever means are urged against said first and second switch means, respectively.

20. The cassette loading apparatus for a video tape recorder as in claim 19; wherein said first lever means is engageable by one of said pin members and an abutment post is provided on said cassette holding means for engagement with said second lever means when in said cassette intermediate position.

21. The cassette loading apparatus for a video tape recorder as in claim 20; wherein said first latch has a V-shaped groove engageable by the other of said pin members as said lid is moved to said first position, and said lid is made to closely confine said cassette insertion opening by a force applied by said first bias means to said first latch.

22. The cassette loading apparatus for a video tape recorder as in claim 20; wherein said one pin member is pressed against said second latch by a force applied by said second biasing means to said second latch as said lid is moved to said second position, and, simultaneously therewith, said one pin member contacts said first lever means so that said first lever means is disengaged from said first switch means and the latter is closed.

23. The cassette loading apparatus for a video tape recorder as in claim 20; wherein said one pin member is disengaged from said second latch and said first lever means as said lid is moved from said second position to said first position so that said first lever means is free to be turned by said third biasing means to engage said first switch means and thereby open the latter.

24. The cassette loading apparatus for a video tape recorder as in claim 23; wherein said cassette intermediate position, said abutment post engages said second lever means, said second lever means is turned thereby against a force applied by said fourth biasing means so that the second lever means is disengaged from said second switch means for closing said second switch means to temporarily stop said drive means and temporarily locate said cassette holding means in said cassette intermediate position if said first switch means is then opened.

25. The cassette loading apparatus for a video tape recorder as in claim 24; wherein said control means causes said drive means to further move said cassette holding means from said cassette intermediately position to said cassette insertion position when said first switch means is closed with said cassette holding means temporarily located at said cassette intermediate position.

26. A cassette loading apparatus for a video tape recorder comprising:
a cabinet having a front panel with a cassette insertion opening therein;
a lid movable between a first position, wherein said cassette insertion opening is closed, and a second position, wherein said cassette insertion opening is opened;
lid detecting means for detecting the position of said lid;
a cassette holder adapted to accept and hold a cassette inserted therein and being movable among a cassette insertion position which is adjacent to said cassette inserting opening, a cassette operation position spaced rearwardly and downwardly from said cassette insertion position, and a cassette intermediate position between said cassette insertion and operation positions;
drive means for driving said cassette holder between said cassette insertion position, said cassette intermediate position, and said cassette operation position;
holder position detecting means for detecting whether said cassette holder is in said cassette operation position; and
control means for controlling said drive means in response to said lid detecting means and said holder position detecting means, said control means being programmed to cause said drive means to drive said cassette holder from said cassette operation position, to said intermediate position and to said insertion position when said lid is detected to be at said first and second positions, respectively.

27. The cassette loading apparatus for a video tape recorder as in claim 26; and further including power supply means for operating the video tape recorder and being actuable between an operative condition, wherein power is supplied to operate the video tape recorder, and an inoperative condition, and power detecting means for detecting when said power supply means is in said operative condition.

28. The cassette loading apparatus for a video tape recorder as in claim 27; wherein said control means is further responsive to said power detecting means and is programmed so that, when said cassette holder is in said intermediate position, while said lid is in said first position and said power supply means is in said inoperative condition, said cassette holder is moved by said drive means to said cassette operation position.

29. The cassette loading apparatus for a video tape recorder as in claim 28; in which the cassette has reels rotatable therein; and further including means for braking reels in the cassette moved with, said cassette holer to said cassette operation position in response to said power means being in said inoperative condition.

30. A cassette loading apparatus for a video tape recorder comprising:
a cabinet having a cassette insertion opening;
a lid moveable between a first position, wherein said cassette insertion opening is closed, and a second position, wherein said cassette insertion opening is opened;
cassette holding means adapted to accept and hold a cassette inserted therein and being movable between a cassette insertion position adjacent said opening and a cassette operation position remote from said opening;
drive means for driving said cassette holding means between said cassette insertion position and said cassette operation position;
lid detecting means for detecting when said lid is in said second position; and
control means for controlling said drive means and being responsive to said lid detecting means indicating said lid is in said second position for causing said drive means to move said cassette holding means from said operation position to said insertion position.

* * * * *